United States Patent
Wagner

(10) Patent No.: US 12,412,952 B2
(45) Date of Patent: Sep. 9, 2025

(54) METHOD FOR PRODUCING A BATTERY MODULE, BATTERY MODULE, TRACTION BATTERY, AND ELECTRICALLY OPERABLE MOTOR VEHICLE

(71) Applicant: Bayerische Motoren Werke Aktiengesellschaft, Munich (DE)

(72) Inventor: Matthias Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 450 days.

(21) Appl. No.: 17/788,090

(22) PCT Filed: Feb. 5, 2021

(86) PCT No.: PCT/EP2021/052794
§ 371 (c)(1),
(2) Date: Jun. 22, 2022

(87) PCT Pub. No.: WO2021/170372
PCT Pub. Date: Sep. 2, 2021

(65) Prior Publication Data
US 2023/0026508 A1    Jan. 26, 2023

(30) Foreign Application Priority Data
Feb. 27, 2020   (DE) .................. 10 2020 105 138.7

(51) Int. Cl.
*H01M 50/26* (2021.01)
*H01M 50/124* (2021.01)
*H01M 50/213* (2021.01)

(52) U.S. Cl.
CPC ....... *H01M 50/26* (2021.01); *H01M 50/1245* (2021.01); *H01M 50/213* (2021.01); *H01M 2220/20* (2013.01)

(58) Field of Classification Search
CPC . H01M 50/26; H01M 50/213; H01M 2220/20
See application file for complete search history.

(56) References Cited

U.S. PATENT DOCUMENTS

| 2014/0322581 A1 | 10/2014 | Rueter et al. |
| 2014/0322582 A1* | 10/2014 | Ruter .................. H01M 50/20 429/177 |

(Continued)

FOREIGN PATENT DOCUMENTS

| DE | 20 2006 004 794 U1 | 8/2007 |
| DE | 10 2011 088 739 A1 | 6/2013 |

(Continued)

OTHER PUBLICATIONS

International Search Report (PCT/ISA/210) issued in PCT Application No. PCT/EP2021/052794 dated Mar. 31, 2021 with English translation (five (5) pages).

(Continued)

*Primary Examiner* — Daniel McNally
(74) *Attorney, Agent, or Firm* — Crowell & Moring LLP

(57) ABSTRACT

The invention relates to a method for producing a battery module for a traction battery of an electrically operable motor vehicle, comprising the steps of: —providing battery cells (1), —providing a holding device (2) for the battery cells (1), which has receiving chambers (3) for the battery cells (1), —at least partially coating an outer side (9) of the battery cells (1) and/or an inner side (6) of the receiving chambers (3) with a microencapsulated adhesive (7), and —inserting the battery cells (1) into the receiving chambers (3), wherein the insertion movement causes a force to be exerted on the microencapsulated adhesive (7), by means of which force the microencapsulated adhesive (7) is activated and cured to fix the battery cells (1) in the receiving chambers (3).

7 Claims, 1 Drawing Sheet

(56) References Cited

U.S. PATENT DOCUMENTS

2014/0322588 A1* 10/2014 Duernegger ........ H01M 50/124
                                                                                             429/149
2020/0016988 A1    1/2020  Kellner

FOREIGN PATENT DOCUMENTS

| DE | 10 2012 216 477 A1 | 4/2014 | | |
|---|---|---|---|---|
| DE | 10 2012 218 188 | 4/2014 | | |
| DE | 10 2013 207 534 A1 | 10/2014 | | |
| DE | 10 2013 207 536 B4 | 2/2019 | | |
| DE | 10 2017 009 385 A1 | 4/2019 | | |
| DE | 10 2018 117 068 A1 | 1/2020 | | |
| EP | 3243228 B1 * | 12/2018 | ......... | G01R 31/3835 |
| WO | WO 2016/112404 A1 | 7/2016 | | |

OTHER PUBLICATIONS

German-language Written Opinion (PCT/ISA/237) issued in PCT Application No. PCT/EP2021/052794 dated Mar. 31, 2021 (six (6) pages).

German-language Search Report issued in German Application No. 10 2020 105 138.7 with partial English translation dated Sep. 28, 2020 (13 pages).

Cover Page of EP 3 243 228 A1 published Jul. 14, 2016 (one (1) page).

* cited by examiner

METHOD FOR PRODUCING A BATTERY MODULE, BATTERY MODULE, TRACTION BATTERY, AND ELECTRICALLY OPERABLE MOTOR VEHICLE

BACKGROUND AND SUMMARY OF THE INVENTION

The invention relates to a method of producing a battery module for a traction battery of an electrically operable motor vehicle. The invention also relates to a battery module, to a traction battery and to an electrically operable motor vehicle.

In the present context, interest is directed to traction batteries of electrically operable motor vehicles, i.e. hybrid or electrical vehicles. Such traction batteries typically have a multitude of interconnected battery cells. Especially in the case of round cells, it is customary to arrange these in a holding device or holder and fix them therein. The fixing is generally effected by force-fitting, bracing, screw connection or adhesive bonding. In the case of adhesive bonding, protrusions of adhesive residues can restrict function or lead to rejects as a result of inexact application or dosage of the adhesive. Furthermore, intricate application of adhesive at many points in production is prone to error and time-consuming.

It is an object of the present invention to provide a simple and inexpensive solution by way of which battery cells for a traction battery of a motor vehicle can be fixed in a holding device.

This object is achieved in accordance with the method, the battery module, the traction battery and the motor vehicle according to the claimed invention.

A method of an embodiment of the invention serves for production of a battery module for a traction battery of an electrically operable motor vehicle. In the method, battery cells and a holding device for the battery cells that has receiving chambers for the battery cells are provided. An outer face of the battery cells and/or an inner face of the receiving chambers is at least partly coated with a microencapsulated adhesive. The battery cells are inserted into the receiving chambers, wherein the inserting motion or insertion exerts a force on the microencapsulated adhesive that activates and cures the microencapsulated adhesive for fixing of the battery cells in the receiving chambers.

An embodiment of the invention also includes a battery module for a traction battery of an electrically operable motor vehicle, produced by the method of the invention. A traction battery of an embodiment of the invention for an electrically operable motor vehicle has at least one battery module of the invention. The rechargeable traction battery or traction accumulator may take the form, for example, of a high-voltage battery. The battery cells may be formed, for example, as prismatic battery cells, round cells or pouch cells. The battery cells provided are more preferably round cells.

The method serves to secure the battery cells in the holding device or carrier component in a very simple manner and with few assembly steps. The holding device, which is especially manufactured from a plastic, may be in plate form, for example, and may have the receiving chambers in the form of through-openings or blind openings. The receiving chambers may thus be formed so as to be open at one end or both ends, according to whether the battery cells have to be contacted at one end or both ends. In the case of round cells, the holding device is preferably formed with cylindrical receiving chambers. The inner faces or inner walls of the receiving chambers and/or the outer faces of the battery cells are coated with the microencapsulated adhesive. Preference is given to coating only the inner faces of the receiving chambers at least in regions with the microencapsulated adhesive. The coating need not be effected promptly before the assembly of the battery module, but may be effected at an early stage, for example by a manufacturer or supplier of the holding device. The holding device may thus already be supplied coated with the microencapsulated adhesive on the part of the supplier.

Microencapsulated adhesives are activated and cure by the action of a force, for example compressive stress or shear stress. The compressive stress or shear stress is exerted here by the insertion of the battery cells into the receiving chambers. The insertion of a battery cell into the respective receiving chamber results in the shear stress or compressive stress at contact faces between the outer face of the battery cell and the inner face of the receiving chamber, which results in activation and then curing of the microencapsulated adhesive. Such a method is particularly advantageous since there is no need for laborious curing of the adhesive, for example by way of heat input.

The invention also relates to an electrically operable motor vehicle having a traction battery of an embodiment of the invention. The motor vehicle is especially designed as a passenger vehicle.

The embodiments presented with regard to the method of an embodiment of the invention and the advantages thereof are correspondingly applicable to the battery module of an embodiment of the invention, to the traction battery of an embodiment of the invention and to the motor vehicle of an embodiment of the invention.

Further features of the invention are apparent from the claims, the figures and the description of the figures. The features and combinations of features mentioned in the description above and the features and combinations of features mentioned in the description of figures and/or shown solely in the figures below are usable not just in the respective combination specified, but also in other combinations or on their own.

The invention is now elucidated in detail by a working example and with reference to the drawings.

DETAILED DESCRIPTION OF THE DRAWINGS

Figure 1:
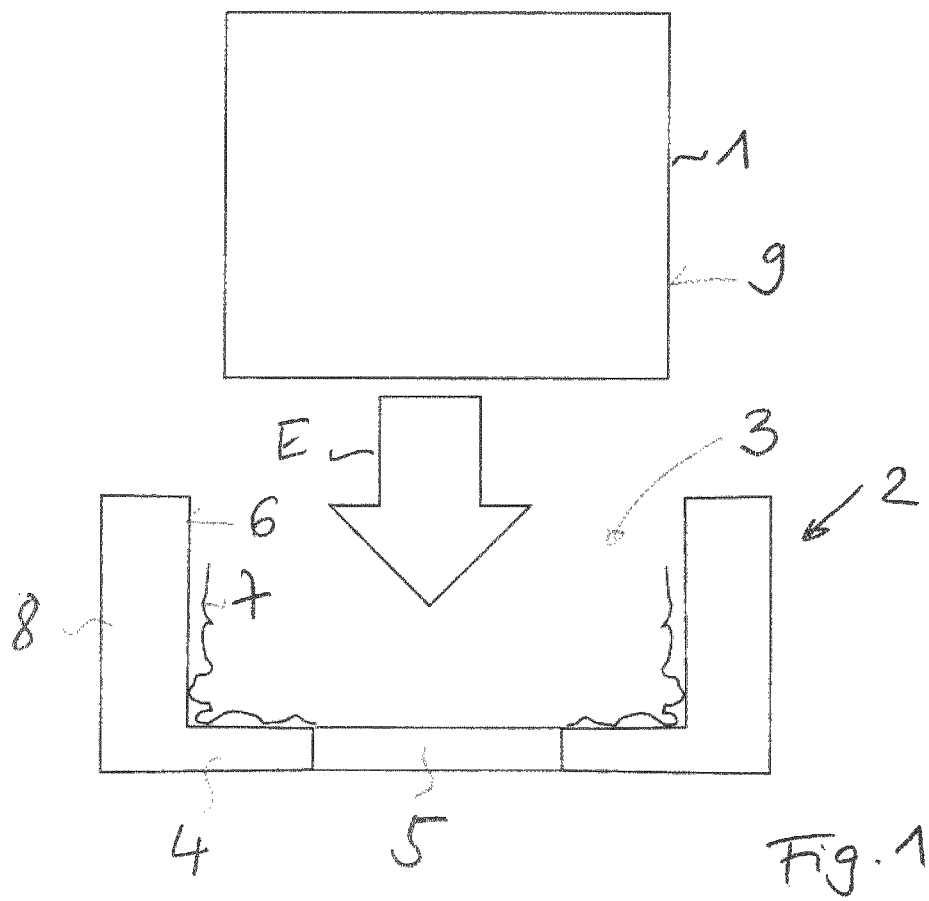
FIG. 1 is a schematic diagram of a first process step for manufacture of a battery module.

In the figures, elements that are the same and have the same function are given the same reference numerals.

Figure 2:
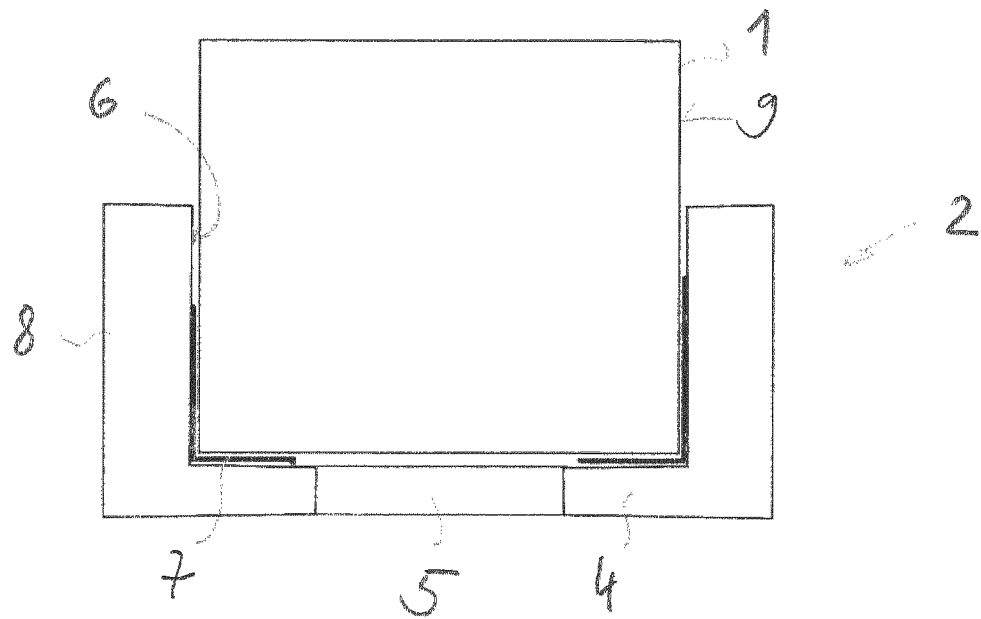
FIG. 2 is a schematic diagram of a second process step for manufacture of the battery module.

FIG. 1 and FIG. 2 show process steps for production of a battery module. The battery module may be used, for example, in a traction battery for an electrically operable motor vehicle. For this purpose, battery cells 1 and a holding device 2 or a carrier component are provided. All that are shown here are a battery cell 1 and a receiving chamber 3 of the holding device 2, into which the battery cell 1 can be inserted in an insertion direction E. The battery cell 1 especially takes the form of a round cell. The receiving chamber 3 especially has a round cross section, i.e. has been formed as a cylindrical cavity.

The receiving chamber 3 has an opening 5 at its base 4, via which the battery cell 1 is contactable in the inserted state (see FIG. 2). In order to be able to hold the battery cell 1 in the holding device 2, the battery cell 1 is fixed in the receiving chamber 3. For this purpose, prior to the insertion of the battery cell 1 into the receiving chamber 3, an inner face 6 of the receiving chamber 3 is coated at least in regions with a microencapsulated adhesive 7. For example, the inner face 6 of side walls 8 and the inner face 6 of the base 4 are coated with the microencapsulated adhesive. Possible thickness tolerances can be compensated for by specific design of a surface of the holding device 2, for example minimal ribbing and compression of the ribs, or via the material selection.

On insertion of the battery cell 1 into the receiving chamber 3, an outer face 9 of the battery cell 1 then exerts shear stress on the inner face 6 of the side walls 8, and compressive stress on the inner face 6 of the base 4. This activates and cures the microencapsulated adhesive 7, as a result of which the battery cell 1 is fixed in the receiving chamber 3. The adhesive 7 is thus activated solely by a force acting in the form of compressive stress and/or shear stress.

The invention claimed is:

1. A method of producing a battery module for a traction battery of an electrically operable motor vehicle, the method comprising:
    providing battery cells,
    providing a holding device for the battery cells, wherein the holding device has receiving chambers for the battery cells,
    at least partially coating an outer face of the battery cells and/or an inner face of the receiving chambers with a microencapsulated adhesive, and
    inserting the battery cells into the receiving chambers, wherein an inserting motion exerts a force on the microencapsulated adhesive that activates and cures the microencapsulated adhesive for fixing of the battery cells in the receiving chambers.

2. The method according to claim 1,
    wherein the battery cells are round cells.

3. The method according to claim 2,
    wherein the receiving chambers are cylindrical.

4. The method according to claim 1,
    wherein the holding device is manufactured from a plastic.

5. A battery module for a traction battery of an electrically operable motor vehicle, wherein the battery module is produced by the method according to claim 1.

6. A traction battery for an electrically operable motor vehicle, the traction battery comprising at least one battery module according to claim 5.

7. A motor vehicle comprising the traction battery according to claim 6.

* * * * *